3,849,377
POLYESTER CONTAINING SULPHONIC
ACID GROUPS
Günther Boehmke, Opladen, Germany, assignor to Bayer
Aktiengesellschaft, Leverkusen, Germany
No Drawing. Filed Sept. 20, 1973, Ser. No. 399,084
Claims priority, application Germany, Sept. 20, 1972,
P 22 46 107.0
Int. Cl. C08g 17/02
U.S. Cl. 260—49         8 Claims

ABSTRACT OF THE DISCLOSURE

Sulphonic acid group-containing polyesters which contain 5 to 50 recurring structural units of the formula

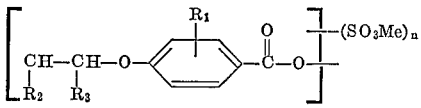

in which $R_1$ represents a hydrogen or chlorine atom or a $C_1$-$C_4$-alkyl group,
$R_2$ and $R_3$ independently of one another represent a hydrogen atom or a $C_1$-$C_2$-alkyl group and
Me represents hydrogen or a cation and
$n$ denotes a number between 0.2 and 1.2, and a process for their manufacture. The polyesters are effective dispersing agents.

---

The invention relates to polyesters; more particularly it concerns sulphonic acid group containing polyesters which contain 5 to 50 recurring structural units of the formula

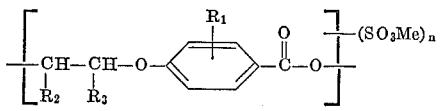   (I)

in which $R_1$ represents a chlorine atom, a $C_1$-$C_4$-alkyl group or preferably a hydrogen atom,
$R_2$ and $R_3$ independently of one another represent a $C_1$-$C_2$-alkyl group or preferably a hydrogen atom, and
Me represents hydrogen or a cation and
$n$ denotes a number between 0.2 and 1.2, a process for their manufacture, and their use as dispersing agents.

Possible cations Me are above all alkali metal ions, such as the sodium ion or potassium ion, alkaline earth metal ions, such as the magnesium ion or calcium ion, and ammonium ions, such as the ammonium ion, the monoethanolammonium, diethanolammonium and triethanolammonium ion and also the cyclohexylammonium ion and the benzylammonium ion.

The polyesters according to the invention, containing sulphonic acid groups, are manufactured either by sulphonation of monomeric 4-(β-hydroxyalkoxy)-benzoic acids of the formula

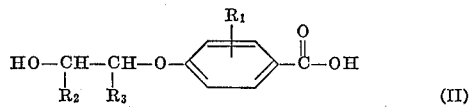   (II)

in which $R_1$, $R_2$ and $R_3$ have the meaning indicated under the formula I and subsequent condensation of the resulting sulphonation products, or by sulphonation of the linear polyesters of 4-(β-hydroxyalkoxy)-benzoic acid which contains 5 to 50 recurring structural units of the formula

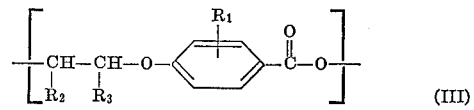   (III)

in which $R_1$, $R_2$ and $R_3$ have the meaning indicated under the formula I.

The sulphonation can be carried out either by treatment of the monomeric 4-(β-hydroxyalkoxy)-benzoic acids, or of the polyesters manufactured therefrom by condensation, with concentrated sulphuric acid at 70 to 140° C., advantageously in vacuo for the purpose of distilling off the water of reaction, or in the presence of an organic solvent which is inert under the reaction conditions and which at the same time forms an azeotropic mixture with the water of reaction, for example toluene or xylene, or by means of chlorosulphonic acid or sulphur trioxide at 20 to 60° C., optionally in the presence of organic solvents which are inert under the reaction conditions, such as hydrocarbons, for example hexane, benzene, toluene or xylene; halogenated hydrocarbons, for example chloroform, carbon tetrachloride, tetrachloroethylene or chlorobenzene; or ethers, for example diethyl ether.

In the sulphonation of the monomeric 4-(β-hydroxyalkoxy)-benzoic acids with concentrated sulphuric acid in vacuo the condensation reaction already starts during the sulphonation so that both reactions take place alongside one another and finally the sulphonated polyester is obtained. Simultaneous sulphonation and condensation in particular occur if the reaction is carried out at temperatures above 90° C., preferably at 90 to 140° C.

In the sulphonation of the monomeric 4-(β-hydroxyalkoxy)-benzoic acids with chlorosulphonic acid or sulphur trioxide the condensation of the sulphonated 4-(β-hydroxyalkoxy)-benzoic acids must be effected by warming the sulphonation products to 80–140° C.; the water produced in the condensation is advantageously distilled off in vacuo or removed by azeotropic distillation with the aid of an inert organic solvent, such as toluene or xylene.

In principle it is also possible first to sulphonate and condense monomeric 4-(β-hydroxyalkoxy)-benzoic acids with the appropriate amounts of concentrated sulphuric acid and to condense the sulphonated product thus obtained together with unsulphonated 4-(β-hydroxyalkoxy)-benzoic acid.

The amount of sulphonation agent to be employed depends on the number of sulphonic acid groups to be introduced; in particular, about 1 to 1.2 mols of sulphonating agent are employed per mol of sulphonic acid group to be introduced. Virtually only catalytic amounts of concentrated sulphuric acid are required for the polycondensation.

The 4-(β-hydroxyalkoxy)-benzoic acids used as starting compounds, and the polyesters manufactured therefrom by condensation, can be manufactured according to processes which are in themselves known. Such processes are described, for example, in German Auslegeschrift (German published specification) 1,281,451 and U.S. patent specification 2,471,023.

To convert the polyesters containing sulphonic acid groups into their alkali metal, alkaline earth metal or ammonium salts, the sulphonated polyesters are neutralised under mild conditions, that is to say at temperatures of 0 to 40° C., preferably at 10 to 30° C., whilst avoiding an excess of alkali.

The polyesters according to the invention, containing sulphonic acid groups, are excellent dispersing agents. Their activity in many cases even surpasses the activity of the known dispersing agents, such as the activity of the naphthalenesulphonic acid-formaldehyde condensation products and of the ligninsulphonic acids. Furthermore, they have the advantage over these agents that they are more easily degradable biologically.

EXAMPLE 1

182 g. (1 mol) of p-hydroxyethoxybenzoic acid (melting point 175° C.; acid number: 307) and 110 g. (1.1 mols) of 98% strength sulphuric acid are heated whilst stirring, first to 100° C. and then, after application of a vacuum of about 15 mm. Hg, to 130° C. 36 g. of water distil off over the course of 6 to 8 hours. The hot residue, 256 g. of a viscous melt, solidifies on cooling to room temperature to give a greenish solid mass.

The mass is dissolved in 200 g. of water whilst stirring and cooling, and during the dissolution process the pH-value of the solution is kept weakly alkaline (pH 7.5 to 8) by constant addition of concentrated sodium hydroxide solution.

The approximately 50% strength neutral solution can be employed, even as such, as a dispersing agent. To obtain the anhydrous salt, the solution is either evaporated to dryness or spray-dried. After either drying process, the salt is obtained in the form of a light brown, brittle powder.

The activity of the powder manifests itself outstandingly when dispersing pigment dyestuffs in a ball mill or bead mill. The product produces excellent stabilisation of dyestuff liquors of disperse dyestuffs, so that even in apparatus dyeing no precipitate is formed.

EXAMPLE 2

182 g. (1 mol) of p-hydroxyethoxy-benzoic acid and 110 g. (1.1 mols) of 98% strength sulphuric acid are heated in vacuo (15 mm. Hg) to 125–130° C. until 18 to 20 g. of water have distilled off. After adding a further 91 g. (0.5 mol) of p-hydroxyethoxybenzoic acid, the reaction mixture is heated for about 6 to 8 hours in vacuo (15 mm. Hg) to 125–135° C. During this time, a further 25 to 27 g. of water distil off, and in the course thereof the viscosity of the reaction mixture increases noticeably. The melt, after cooling only a little, is stirred into 300 g. of ice water whilst cooling. The condensation product which first separates out as a solidified resin however soon dissolves in the water, to which concentrated sodium hydroxide solution is added continuously in order to maintain a weakly alkaline reaction. The aqueous solution is subsequently spray-dried.

The condensation product, which is obtained as a free-flowing powder, is a very effective dispersing agent which, in addition to its increased activity compared to the known dispersing agents, has the advantage that it has less tendency to cake in moist air.

EXAMPLE 3

196 g. (1 mol) of p-hydroxypropoxy-benzoic acid (melting point: 140 to 141° C.) are introduced into 110 g. (1.1 mols) of 98% strength sulphuric acid at 70 to 80° C., whilst stirring. After applying a vacuum of about 15 mm. Hg, the reaction mixture is warmed to 130° C. over the course of 3 hours and is kept for 2 hours at this temperature. During this time, about 36 g. of water distil off. After the melt has cooled, it is dissolved by adding 250 g. of water whilst stirring and constantly neutralising with concentrated sodium hydroxide solution. The dark brown solution is concentrated to dryness in vacuo. A loose powder is obtained, which very easily redissolves in water and has excellent dispersing properties.

EXAMPLE 4

187 g. (1 mol) of p-hydroxyethoxy-benzoic acid are dispersed in 400 g. of perchloroethylene. 2 g. of chlorosulphonic acid are added as the esterification catalyst. The reaction mixture is then heated to refluxing, whilst stirring. The distillation reflux is at the same time passed through a water separator which allows the water to be separated from the perchloroethylene. After about 18 g. of water have been separated off, the esterification (condensation) to give the polyester is complete and the reaction mixture is allowed to cool to about 35–40° C. 130 g. (1.1 mols) of chlorosulphonic acid are then added dropwise to the reaction mixture at approximately the same temperature. After a further 3 to 5 hours' reaction at 45 to 50° C., the reaction is complete. The reaction mixture is freed of hydrogen chloride by passing in nitrogen. After cooling, the largely undissolved polyester-sulphonic acid is dissolved by adding 300 g. of water and simultaneously neutralising with concentrated potassium hydroxide solution. The aqueous solution is separated from the perchloroethylene and evaporated to dryness in vacuo.

The 4-(β-hydroxyethoxy)-benzoic acid polyester containing sulphonic acid groups (as the potassium salt) is a light brown free-flowing powder which is distinguished by an outstanding dispersing action.

Excellent effective dispersing agents of the same quality were also obtained if instead of 130 g. chlorosulphonic acid there were used: (a) 65 g. (0.55 mol), (b) 41 g. (0.35 mol) or (c) 82 g. (0.7 mol) chlorosulphonic acid.

EXAMPLE 5

182 g. (1 mol) of p-hydroxyethoxy-benzoic acid and 2 g. of p-toluenesulphonic acid are heated to 150–170° C. in vacuo (about 15 mm. Hg) until the weight of the reaction mixture has fallen to about 166 g. The melt is dispersed in 400 ml. of methylene chloride and is sulphonated with 130 g. (1.1 mols) of chlorosulphonic acid at 35 to 40° C. as described in Example 4. The reaction is completed by warming the reaction mixture to refluxing. The polyester-sulphonic acid is dissolved in 300 ml. of water, whilst cooling and stirring and simultaneously neutralising the reaction mixture with concentrated sodium hydroxide solution. After separating off the solvent, the aqueous solution is evaporated to dryness in vacuo. The sulphonated 4-(β-hydroxyethoxy)-benzoic acid polyester (sodium salt) thus obtained is in the form of a yellowish powder which can be sprinkled and which is distinguished by an outstanding dispersing action.

The excellent dispersing action and the high stability to boiling of the dispersions obtained with the product can be seen from the following experiment: 0.1 g. of the finely ground disperse dyestuff (Colour Index Disperse Yellow 60) and 0.08 g. of the dispersing agent according to the invention are stirred in 100 ml. of water. The dispersion is heated to the boil for 30 minutes and is subsequently suction-filtered through a paper filter. After drying the filter, no residue of the pigment dyestuff is detectable thereon. The finely dispersed dyestuff has passed through the filter.

A product of similar quality was obtained if instead of 130 g. chlorosulphonic acid there were used 152 g. (1.3 mol) of this acid.

What is claimed is:

1. Sulphonic acid group containing polyesters, which consist essentially of 5 to 50 recurring structural units of the formula

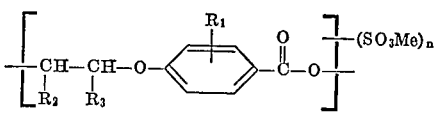

in which $R_1$ is hydrogen, chloro or $C_1$–$C_4$-alkyl;

$R_2$ and $R_3$ independently of one another are hydrogen or $C_1$–$C_2$-alkyl;

Me is hydrogen, alkali metal, alkaline earth metal, ammonium, monoethanolammonium, diethanolammonium, triethanolammonium, cyclohexylammonium, or benzylammonium; and $n$ is a number between 0.2 and 1.2.

2. Polyesters, of claim 1, wherein $R_1$, $R_2$ and $R_3$ are hydrogen.

3. Process for the manufacture of sulphonic acid group containing polyesters of claim 1 wherein 4-(β-hydroxyalkoxy)-benzoic acids of the formula

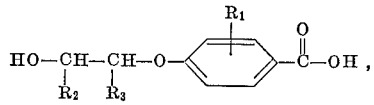

in which $R_1$, $R_2$ and $R_3$ have the meaning given in claim 8, are sulphonated with 1 to 1.2 mols of sulphonating agent per mol of sulphonic acid groups to be introduced and are condensed at 70°–140° C.

4. Process of claim 3 wherein the sulphonation and condensation are carried out simultaneously.

5. Process of claim 3 wherein the condensation is carried out subsequent to the sulphonation.

6. Process of claim 3 wherein the sulphonation is carried out subsequent to the condensation.

7. Process of claim 3, wherein the sulphonation is carried out with concentrated sulphuric acid at 90 to 140° C., with simultaneous condensation.

8. Process of claim 7, wherein the simultaneous sulphonation and condensation is carried out in vacuo.

References Cited
UNITED STATES PATENTS

| | | | |
|---|---|---|---|
| 3,004,006 | 10/1961 | King et al. | 260—79.3 |
| 3,313,778 | 4/1967 | Sakurai et al. | 260—49 |
| 3,238,180 | 3/1966 | Wiloth | 260—47 |
| 3,166,531 | 1/1965 | Horn | 260—49 |
| 3,541,050 | 11/1970 | Tanaka et al. | 260—49 |
| 3,663,508 | 5/1972 | Mobius et al. | 260—49 |
| 3,663,509 | 5/1972 | Bonnard et al. | 260—49 |
| 3,758,442 | 9/1973 | Shima et al. | 260—47 C |

LESTER L. LEE, Primary Examiner

U.S. Cl. X.R.

260—29.2 R, 30.8 R, 47 C